Nov. 26, 1935.  L. L. LAWYER  2,022,209
TROUBLE LAMP
Filed Oct. 30, 1934
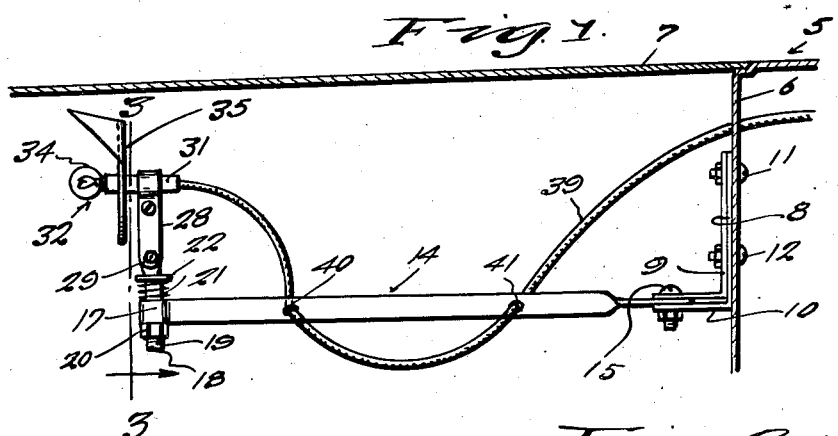
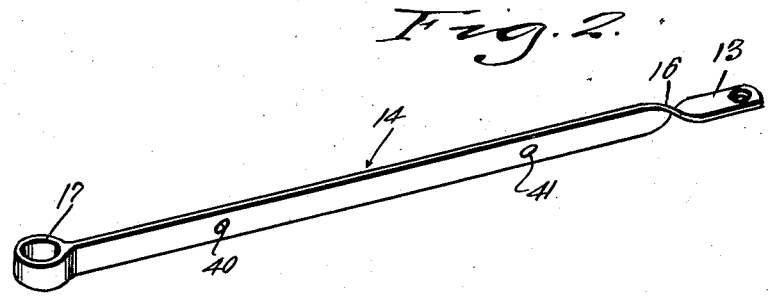
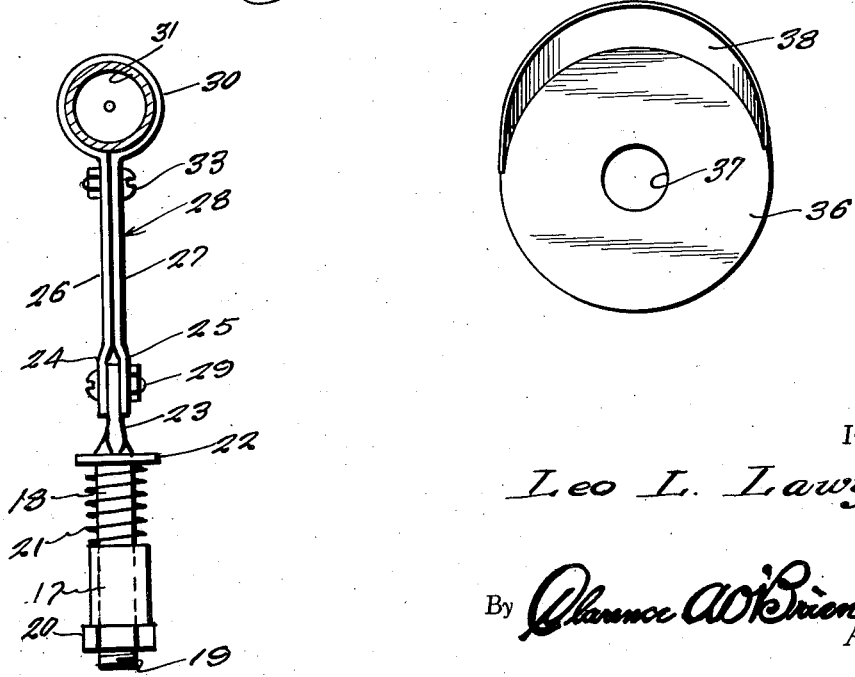
Inventor
Leo L. Lawyer
By Clarence A. O'Brien
Attorney Patented Nov. 26, 1935

2,022,209

UNITED STATES PATENT OFFICE 2,022,209

TROUBLE LAMP

Leo Lewis Lawyer, Idaho Falls, Idaho

Application October 30, 1934, Serial No. 750,725

1 Claim. (Cl. 240—8.18)

My invention reates generally to automobile lighting devices, and particularly to an automobile trouble lamp for mounting under the hood for use when making engine inspections or repairs, and an important object of my invention is to provide a lamp of the character indicated which is simple and efficient and is adjustable so as to meet all requirements for a lamp of this character.

Another important object of my invention is to provide a permanently mounted lamp of the character indicated above which is constantly in place for use and which can be manufactured and installed at low cost.

Other objects and advantages of my invention will be apparent from a reading of the following description in connection with the drawing, wherein for purposes of illustration I have shown a preferred embodiment of my invention.

In the drawing:—

Figure 1 is a longitudinal sectional view through the cowl, dashboard, and a portion of the hood of an automobile showing the device of the invention mounted in connection therewith.

Figure 2 is a perspective view of the horizontal arm of the adjustable bracket.

Figure 3 is a transverse vertical sectional view taken through Figure 1 approximately on the line 3—3 and looking toward the right in the direction of the arrows.

Figure 4 is an elevational view of the front of the reflector.

Referring in detail to the drawing, the numeral 5 generally designates the cowl of the automobile including the dash 6, and the numeral 7 generally designates the overlying hood. Although the lamp of the invention is preferably mounted on the front of the dash 6, and such an arrangement best embodies the invention, it will be understood that the lamp might be mounted at other places on the automobile where the same would serve an equivalent purpose of illuminating parts of the automobile to facilitate working thereon at nighttime or in dark places.

The lamp includes the bracket 8 which consists of a pair of L-shaped bars 9 and 10 which have their standard portions bolted as indicated at 11 and 12 to the front of the dash 6 so that their foot portions extend horizontally and forwardly from the front of the dashboard 6 where they receive therebetween the flat part 13 of the horizontally swingable bracket 14, which flat part 13 is pivoted in the position indicated by a bolt 15.

The bracket arm 14 consists of a flat bar arranged in a vertical plane and having a twisted part 16 terminating in the horizontal flat part 13, the arm being provided at its front end with an eye or socket 17 arranged to receive the bolt 18 which is rotatable therein and is threaded as indicated at 19 on its lower end to receive the nut 20 which is arranged to engage the underside of the eye 17 while the opposite side of the eye 17 is engaged by a helical spring 21 whose upper end engages a flange or washer 22 near the upper end of the bolt 18 and below a flattened portion 23, which is disposed between the outwardly offset portions 24, 25, respectively, on the lower ends of the clamp arms 26, 27 of the lamp holding bracket 28, the said parts 24, 25 being traversed by a pivot bolt 29 which traverses also the flat part 23 of the bolt 18.

The upper ends of the clamp arms 26, 27 merge into the opposite ends of the clamping ring 30 which embraces the socket 31 of the lamp 32. A clamping bolt 33 traverses the upper part of the arms 26, 27 for the purpose of contracting the ring 30 on the socket of the lamp.

The socket 31 is cylindrical in form and elongated and is of the single contact type, socketing the bulb 34. Back of the bulb equipped end of the socket 31 is the reflector 35.

The reflector 35 comprises a circular disk 36 having a circular opening 37 at its center to receive the cylindrical socket. Extending approximately one-half around the circumference of one side of the disk 36 is the shade 38. While the surface of the disk 36 is the reflector proper, the inner surface of the shade 38 also acts as a reflector, but chiefly as a protection for the eyes of the operator while working, the arrangement providing means whereby the light may be directed to the place to be illuminated. As shown the shade 38 is of conical segmental form.

A conduit 39 containing a single wire may be led through holes 40 and 41 in the bracket arm 14 so as to be suitably supported in connection with the back end of the socket 31, the electrical circuit to the bulb 32 being completed to ground through the bracket and the dashboard 6.

It will be observed that the bracket 14 may be swung from side to side through approximately 180 degrees, that the lamp bracket 28 may be rotated on a vertical axis through approximately 360 degrees, that the lamp bracket 28 may be tilted on the pivot bolt 29 through approximately 180 degrees; so that any desired position of the lamp may be provided for working upon different parts of the automobile under the hood 7. By lifting one side of the hood and properly adjusting the lamp of the invention, illumination may be available for the roadside or for campers' use, without removing or disconnecting the lamp in any way.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

A lamp of the character described comprising a bracket including a part to be stationarily mounted on a support, a horizontal member pivoted thereto for swinging movement in a horizontal plane, a vertical member attached to an outer part of the horizontal member for rotation on a vertical axis, resilient means for yieldably maintaining said vertical member in a predetermined position, a lamp bracket pivoted on a horizontal axis to the vertical member, a lamp socket connected to said vertical member for rotation in a vertical plane and having its axis initially in a horizontal plane, and a reflector on said socket, said horizontal member being provided with means for receiving and holding the electrical conductors supplying electrical energy to the lamp.

LEO LEWIS LAWYER.